United States Patent [19]

Satake

[11] Patent Number: 4,462,579
[45] Date of Patent: Jul. 31, 1984

[54] TILTING ROTARY TABLE DEVICE
[75] Inventor: Eishin Satake, Kanazawa, Japan
[73] Assignee: Tsudakoma Kogyo Kabushiki Kaisha, Ishikawa, Japan
[21] Appl. No.: 361,627
[22] Filed: Mar. 25, 1982
[51] Int. Cl.³ .............................................. B23Q 3/18
[52] U.S. Cl. ......................................... 269/61; 108/7; 108/20; 91/368; 91/428
[58] Field of Search ........................ 91/368, 382, 428; 269/323, 324, 61, 58; 108/7, 20

[56] References Cited

U.S. PATENT DOCUMENTS

| | | | |
|---|---|---|---|
| 1,883,166 | 10/1932 | Vickers | 91/428 X |
| 1,963,897 | 6/1934 | Greville | 269/323 X |
| 2,483,811 | 10/1949 | Cullen | 269/61 X |
| 2,601,760 | 7/1952 | Swartz et al. | 91/382 X |
| 2,871,768 | 2/1959 | Froberg, Jr. | 269/61 X |
| 2,884,242 | 4/1959 | Fleming | 269/61 |
| 3,039,766 | 6/1962 | Aronson | 269/61 |
| 3,273,879 | 9/1966 | Floren | 269/61 |

OTHER PUBLICATIONS

Leaflet entitled "Tsudakoma", Catalogue No. 13-80A, Tsudakoma Kogyo, Ltd., Feb. 1980.

*Primary Examiner*—Frederick R. Schmidt
*Assistant Examiner*—Steven P. Schad
*Attorney, Agent, or Firm*—Armstrong, Nikaido, Marmelstein & Kubovcik

[57] ABSTRACT

A tilting table for machining works is of the worm and worm wheel type incorporating a hydraulic servomechanism. A displacement of a stylus operating lever effected by the drive worm shaft moves the servocontrol valve out of its neutral position, thereby causing a tilting motion of the table in a desired direction via a hydraulic power unit of the mechanism. Due to a linkage connection between the table and the lever, the movement of the table always follows the lever so as to compensate the initial displacement, resulting in light and accurate positioning of the inclined table.

11 Claims, 7 Drawing Figures

TILTING ROTARY TABLE DEVICE

BACKGROUND OF THE INVENTION

1. Field of the Invention

This invention relates to a table capable of tilting motion, more particularly, to a tilting rotary table device for subjecting a workpiece secured thereon to machining or scribing.

2. Description of the Prior Art

A conventional tilting rotary table device comprises a worm, which is rotatably disposed on a fixed base and provided with a handle at one end thereof, and a sector wheel, which is formed on the bottom frame of a tilting rotary table member and engaged with the worm. Such a device is adapted to set the tilting rotary table member rotatably supported on the fixed base to a desired inclination.

In a tilting rotary table device using such a worm gearing mechanism, however, shifts of the center of gravity of the workpiece secured on the table when the inclination is set cause the meshing part of the worm gearing to receive a part of the diagonal component of the load, thereby causing elastic strain and error in the set position of inclination. The mode of occurrence of error varies not only according to the magnitude of the table load and the inclination, but also according to the variation of cutting force as well as the variation of cutting direction. Furthermore, in cutting operations in which the loading direction is repeatedly reversed or in tilting operations in which the inclination of the table is changed, the change of the center of gravity of the workpiece secured on the table causes error in the inclination of the table corresponding to the backlash between the worm and the worm wheel.

Accordingly, the accuracy of engagement between the worm and the worm wheel of the worm gearing, the decisive factor behind accuracy of inclination of the tilting table, has had to be improved. This has been done through high precision machining and careful examination and selection of materials. Nevertheless, it has become increasingly difficult to attain satisfactory accurate inclination. This is because of the increasingly heavier, thereby larger, tables being used and the increasingly greater work loads. These have made the working surfaces of the worm gearing more susceptible to wear. This wear results in increased backlash in the worm gearing, causing error in the set inclination greater than tolerance.

Mechanical table tilting operations using worm gearing further require increased torque for operating the worm gearing along with increased table loads. Further, when a motor is employed to rotate the worm, the speed of the worm shaft varies, making the smooth control of the table tilting operation difficult.

BRIEF SUMMARY OF THE INVENTION

Accordingly, it is an object of the present invention to provide an improved tilting rotary table device. According to the present invention, the direct gear-drive system using worm gearing, employed in conventional tilting rotary table devices, is replaced by a driving system incorporating a hydraulic servocontrol system totally unaffected by the load applied to the tilting rotary table, thereby eliminating the aforementioned disadvantages of conventional tilting rotary table devices. In the tilting rotary table device of the present invention, the tilting rotary table is operated by the driving force of a power cylinder which is an integral component of the hydraulic servomechanism, while the operation of the power cylinder is controlled by a control valve device which is also a component of the servomechanism.

Other objects, features, and advantages of the present invention will become apparent from the following description of two different embodiments with reference to the accompanying drawings.

BRIEF DESCRIPTION OF THE DRAWINGS

FIGS. 2 to 5 illustrate various portions of a first embodiment of the tilting rotary table device according to the present invention, wherein FIG. 2 is a side elevation of the device incorporating a hydraulic servomechanism disposed on the base, FIG. 3 is a sectional view showing a tilting-rotary-table clamping device employing a double-piston mechanism and showing a tilting-rotary-table pivoting mechanism, FIGS. 4 and 5 are sectional views showing in detail the construction of a hydraulic worm shaft clamping device;

DETAILED DESCRIPTION OF THE INVENTION

Figure 1:
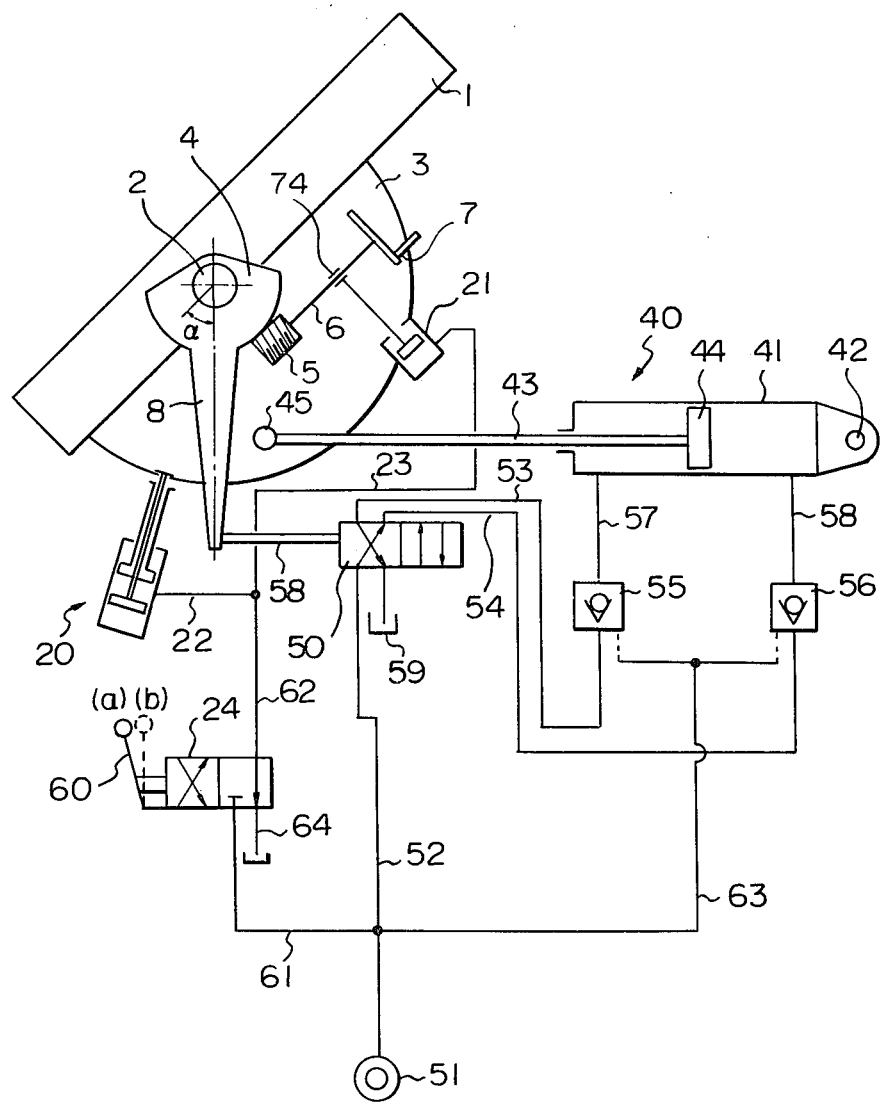
FIG. 1 is a schematic illustration for facilitating the explanation of the principle of a tilting rotary table device according to the present invention.

Referring first to FIG. 1, illustrating the skeleton of a first embodiment of the tilting rotary table device according to the present invention, the device generally comprises a base frame section adapted to support a tilting rotary table for tilting rotary motion, a tilting rotary table section, and a hydraulic servomechanism for tilting the tilting rotary table to a desired inclination. In FIG. 1, a tilting rotary table 1 is rotatably supported on bearings mounted on the base frame by means of trunnions 2 formed integrally on both sides of the tilting rotary table at a lower part thereof. A sector worm wheel 4 is fitted loosely on one of the trunnions 2 for rotation thereon. The sector worm wheel 4 is engaged with a worm 5. The worm shaft 6 of the worm 5 is rotatably received in a bearing device mounted on the frame 3 of the tilting rotary table for rotation by means of a manually operated handle 7. This allows, for instance, the sector wheel 4 to be rotated to set the tilting rotary table 1 to a desired inclination by means of a hydraulic servomechanism, described afterward. A table clamping cylinder device 20 is provided for locking the table to the base after the table 1 has been set to the desired inclination. A worm clamping cylinder device 21 is provided for checking the idle rotary movement of the worm shaft 6 during machining operations with the table fixed at an inclination.

Reference numeral 40 designates a hydraulic servomechanism constituting an essential component of the tilting rotary table device of the present invention. The hydraulic servomechanism 40 comprises a power cylinder 41 pivotally attached to the base at the pivotal mounting part 42, a servocontrol valve 50 adapted to supply hydraulic fluid selectively to the right and the left chambers of the power cylinder, and a stylus operating arm 8 connected to a stylus 58 attached to one end of the servocontrol valve in continuous abutment with the stylus. The stylus operating arm 8 and the sector worm wheel 4 are connected together for synchronous rotation. The free end of the stylus operating arm 8 causes minute detecting movement of the stylus in accordance with the rotary operation of the worm shaft 6. The servocontrol valve 50 selectively connects the output passages 53 or 54 thereof communicating with the left chamber or the right chamber, respectively, of the power cylinder to the source 51 of the pressurized hydraulic fluid for selectively supplying hydraulic fluid to the left or the right chamber of the power cylinder.

In FIG. 1, reference numerals 55 and 56 designate pilot check valves of a known type. The connecting circuit 63 of the pilot check valves is a hydraulic safety circuit for prevention of accidental tilting of the tilting rotary table due to an unforeseen drop of the supply pressure of the source 51 of the pressurized hydraulic fluid below a predetermined pressure. As mentioned earlier, the tilting rotary table device of the present invention further comprises two hydraulic clamping systems, namely, the table clamping cylinder device 20 for clamping the tilting rotary table 1 to the base thereof and the worm clamping cylinder device 21 for clamping the worm shaft 6 to the tilting rotary table 1. Pressurized hydraulic fluid is supplied from the same source 51 to those clamping cylinder devices 20 and 21 through a passage 61 arranged on the lefthand side as viewed in FIG. 1, a clamp control valve 24 having an operating handle, the output passage 62 of the clamp control valve 24, and passages 22 and 23, respectively, through the two-position operation of the clamp operating handle 60. The table clamping cylinder device 20 is formed as a double-piston type device capable of gripping the leg member of the table between two pistons to avoid straining the tilting rotary table by single-directional press-clamping action.

The operating mode of the tilting rotary table 1 will now be described in reference to FIG. 1.

1. In setting the tilting rotary table 1 to a predetermined inclination, first the clamp operating handle 60 is operated manually to a position (a). This causes the clamp control valve 24 to block the passage 61 supplying passages 62, 22, and 23 with pressurized hydraulic fluid from the source 51 and to connect the passages 62, 22, and 23 to a draining passage 64, thereby cancelling the table clamping action and the worm shaft clamping action.

2. Next, for example, the worm operating handle 7 is rotated to turn the stylus operating arm 8 minutely in the clockwise direction through the worm 5 and the sector worm wheel 4, thereby tilting the tilting rotary table 1 in a leftward declivity as viewed in FIG. 1. The stylus of the hydraulic servocontrol valve 50 in contact with the free end of the operating arm 8 is therefore shifted from its neutral position (wherein the hydraulic servocontrol valve 50 interrupts the pressurized hydraulic fluid supplying passage) to the left position by the resilient force of a compression spring contained within the hydraulic servocontrol valve 50. This connects the related passages to supply the pressurized hydraulic fluid to the power cylinder 41 through a circuit of the source 51 - the passage 52 - the servocontrol valve 50 - the passage 53 - the pilot check valve 55 - the left chamber of the power cylinder 41. Consequently, the intensive pressure of the hydraulic fluid drives the frame 3 of the tilting rotary table for counterclockwise rotation, namely, for tilting the tilting rotary table 1 in a leftward declivity, through the piston 44, the piston rod 43, and a rotary joint 45. The stylus operating arm 8 is rotated together with the tilting rotary table 1 according to the movement of the tilting rotary table 1, thereby continuously controlled the stylus operating arm 8 to return the servocontrol valve 50 to its neutral position. The supply of the pressurized hydraulic fluid to the power cylinder is therefore interrupted immediately after the supply of the hydraulic fluid to the power cylinder has started. Thus the tilting rotary table tilting operation continues as long as the worm shaft 6 is rotated.

3. After the tilting rotary table 1 has been tilted to the predetermined inclination, the worm shaft rotating operation is stopped. The clamp operating handle 60 is then shifted from position (a) to position (b), thereby shifting the clamp control valve 24 so as to connect the clamping cylinders to the source 51 of the pressurized hydraulic source through the circuit of the source 51 of pressurized hydraulic fluid - the passage 61 - the clamp control valve 24 - the passage 62 - (the passage 22 - table clamping cylinder device 20) - (passage 23 - worm shaft clamping cylinder device 21). Since the tilting rotary table 1 and the worm gearing 4-5 are firmly fixed by the hydraulic clamping system, the workpiece held on the tilting rotary table 1 can be accurately machined without being affected by the variation of the load.

Since the response characteristic of the servomechanism as described above is of a high sensitivity as well as of a high speed, the angle setting accuracy of the tilting rotary table device of the present invention is an angle of one minute or less. This compares with angle setting accuracy of conventional tilting rotary tables of a minimum 10 minutes. Furthermore, the servocontrol valve 50 has a displacement sensing and responding accuracy of a sensitivity of 5/1000 mm, which corresponds to an angle of rotation of tan $0.05/200 = 0.08$ minutes of the stylus operating arm 8, assuming an effective working radius of the stylus operating arm 8 of 200 mm. Such high sensitivity and a high speed response characteristics of the servomechanism make the tilting rotary table device of the present invention applicable to continuous machining with continuously varying inclinations of the tilting rotary table, which has been impossible with conventional tilting rotary table devices.

The operating mode of machining with continuously varying inclinations of the tilting rotary table will now be described.

First, the clamp operating handle 60 is shifted to position (a) to disengage the hydraulic clamping system, as in the first step for setting the tilting rotary table to a fixed inclination. The worm shaft 6 is then rotated at a controlled variable rate, in accordance with a predetermined machining sequential program, by means of a known driving device, for example, a pulse motor, to control the tilting operation of the tilting rotary table. During the controlled tilting operation, the stylus of the servocontrol valve 50 accurately and rapidly detects the movement of the stylus operating arm 8 resulting from the rotation of the worm shaft 6 and causes the power cylinder 41 to provide a force corresponding to the minute angular displacement of the stylus operating arm 8, whereby the tilting rotary table 1 is continuously tilted. If the power cylinder is designed to have a strength sufficient to endure the load working on the power cylinder during machining, the inclination of the tilting rotary table can be secured. If, by any possibility, the inclination of the tilting rotary table should deviate from the set inclination, the servocontrol valve 50 detects the deviation of the inclination, through the movement of the stylus operating arm 8, and responds instantly to correct the inclination, thus maintaining a highly precise inclination setting.

Figure 2:
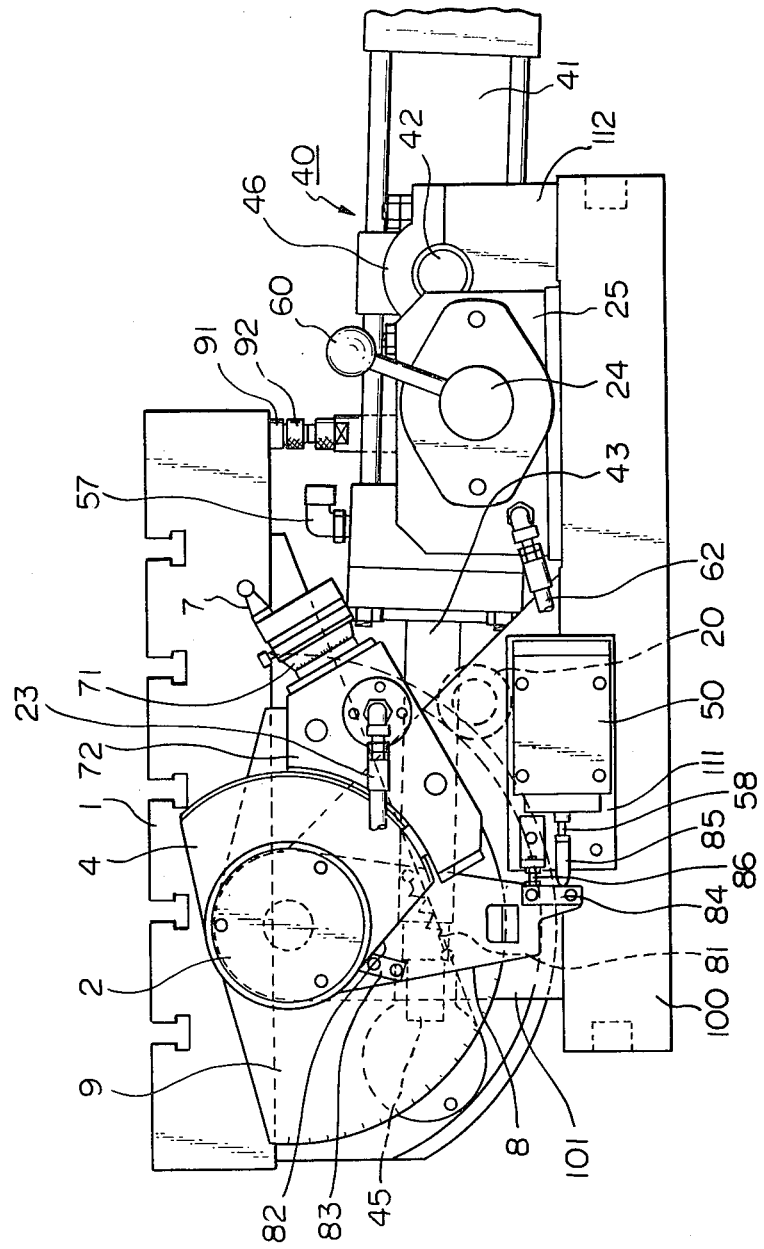

FIG. 2 shows a first embodiment based on the principle as described hereinbefore with reference to FIG. 1.

Figure 3:
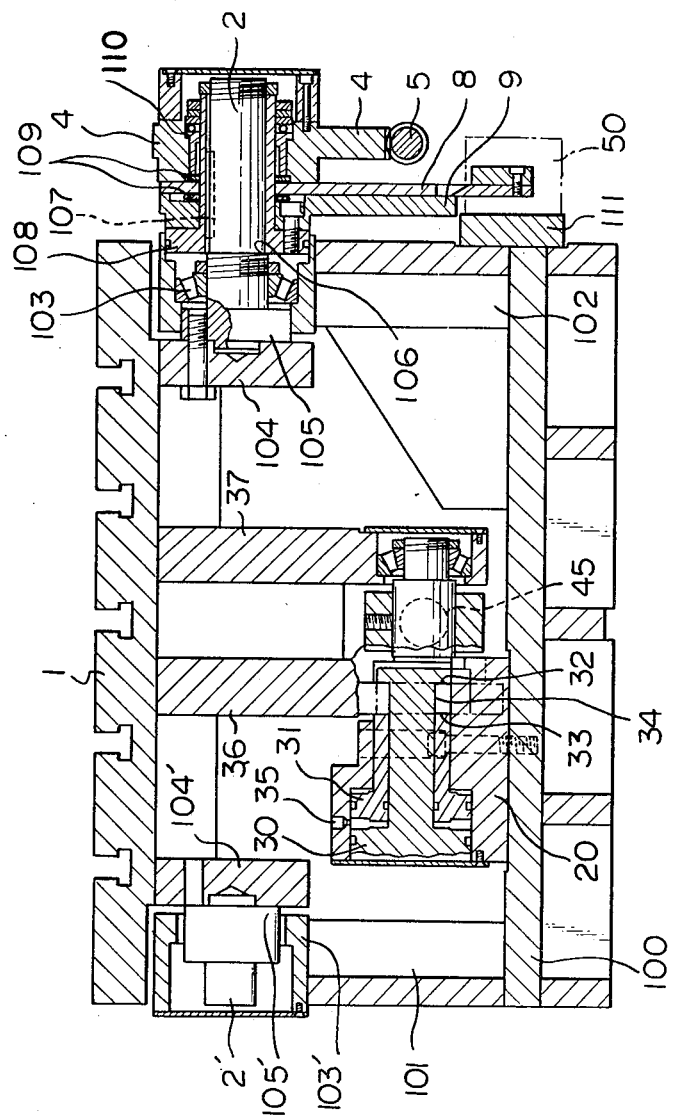

Referring to FIGS. 2 and 3, base frames 101 and 102 are fixed upright on opposite sides of a base 100 functioning as a pedestal for the tilting rotary table 1. The trunnions 2 and 2' of the tilting rotary table 1 are rotatably supported on rolling bearings 103 and 103' mounted on the upper ends of the base frames 101 and 102. Flanges 105 and 105' formed on the trunnions 2 and 2' at the respective inner ends thereof are bolted to legs 104 and 104' which extend downward from the underside of the tilting rotary table 1. The trunnions 2 and 2' are disposed below the top surface of the tilting rotary table and extend horizontally. The right trunnion 2 on the right side as viewed in FIG. 3 extends longer than the left trunnion 2'. The sector worm wheel 4 and the stylus operating arm 8, each an essential component of the device of the present invention, are loosely rotatably fitted on the right trunnion 2. The sector worm wheel 4 and the stylus operating arm 8 are connected resiliently by means of an extension spring 81 with the stopper 82 of the sector wheel and the stopper 83 of the stylus operating arm 8 in abutment with each other so that the sector worm wheel 4 and the stylus operating arm 8 are rotatable as a single unit (FIG. 2). An inclination scale plate 9 for indicating the approximate inclination of the tilting rotary table is incorporated into the trunnion 2. A flanged sleeve 108 provided with a shoulder 106 and a key way 107 is keyed on the right trunnion 2 on the outside of the bearing 103. The inclination scale plate 9 is bolted to the flange of the flanged sleeve 108. A pair of thrust bearings 109 and combined bearings 110 are fitted on the sleeve portion of the flanged sleeve 108 so as to loosely and rotatably fit the stylus operating arm 8 and the sector wheel 4 on the flanged sleeve 108 at the respective predetermined positions thereon.

Figure 4:
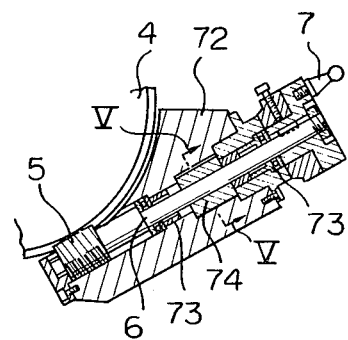

The sector worm wheel 4 is engaged with the worm 5. A handle 7 provided with vernier indexing graduations 71 for indicating accurate inclination is fixed to the outer end of the worm shaft 6 (FIGS. 2 and 4). The worm shaft 6 is supported on rolling bearings 73 within a housing 72 fixed on the surface of the scale plate 9.

A hydraulic servocontrol valve unit is disposed on the base 100 near the free end of the stylus operating arm 8. The servocontrol valve 50 of the hydraulic servocontrol unit is fixed on the base frame 111. The servocontrol valve 50 is disposed with the axis of its valve rod perpendicularly intersecting the radius of oscillation of the stylus operating arm 8, so that a stylus 85 attached to the free end of the valve rod is continuously in contact with the free end of the stylus operating arm 8 against the resilient force of a spring to transmit the minute movement of the stylus operating arm 8 to the stylus 85 (FIG. 2).

As described hereinbefore, when the servocontrol valve is in the neutral position, the application of hydraulic pressure to the power cylinder 41 is interrupted. When the servocontrol valve is shifted slightly rightward or leftward, the source of the pressurized hydraulic fluid is connected through a circuit to the power cylinder 41 to supply pressurized hydraulic fluid to the right or left chamber, respectively. The response accuracy of the stylus 85 is in the order of 5/1000 mm. Accordingly, the maximum stroke of the stylus 85 of around 3 mm is sufficient for accurately controlling the inclination of the tilting rotary table. A limiting pin 86 functioning as a stopper is provided on the base frame 111 near the stylus to limit the movement of the stylus to within a small range to prevent it from being damaged. As a result, when the rotation of the worm shaft 6 moves the stylus operating arm 8, engaged with the sector worm wheel 4, in toward the stylus at a speed faster than the speed of the tilting rotary table, for example, the limiting pin 86 checks the movement of the stylus operating arm 8. The rapid rotation of the worm 4 then stretches the extension spring 81 between the stylus operating arm 8 and the sector worm wheel 4, thus preventing breakage of the servocontrol valve and the worm gearing.

Figure 6:
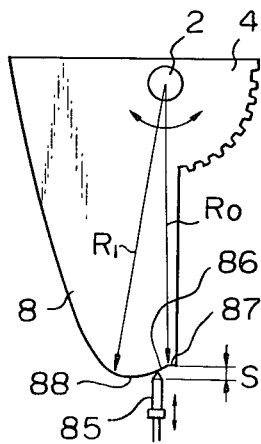
FIG. 6 is a schematic view showing a modified disposition of an operating arm and a stylus.

FIG. 6 shows a modified form of the stylus operating mechanism wherein the minute movement of a stylus 85 is caused by the rotary motion of a stylus operating arm 8. In this modified form, the direction of movement of the valve rod of the hydraulic servocontrol valve, namely, the axis of the valve rod, is directed toward the center of rotation of the stylus operating arm 8. A cam surface is formed along the periphery of the stylus operating arm. The cam surface is shaped by successive curved surfaces of different radii of rotation, namely, a circular surface 87 of a fixed smaller radius of rotation, a flat or curved cam surface 86 of a progressively increasing radius of rotation, and a circular surface 88 of a fixed larger radius of rotation. The fixed smaller radius and the fixed larger radius are selectively determined so as to make the difference therebetween, i.e., the effective lifts of the cam surface 86, correspond to the maximum limit of the stroke of the stylus 85. The stylus 85 is positioned at the neutral position thereof when it is in contact with the cam surface 86 at the central part thereof. The circular surface 88 of a fixed larger radius is formed preferably so as to extend leftward, as viewed in FIG. 6, extensively in order to prevent the stylus 85 from being pushed out from the valve body by the spring biasing the stylus 85 when the stylus operating arm 8 engaged with the sector worm wheel 4 in a single unit is rotated at a speed greater than that of the tilting rotary table 1. This design of the mechanism allows the sector worm wheel 4 and the stylus operating arm 8 to be formed as a single component, thereby allowing the omission of the above-mentioned extension spring 81, stoppers 82 and 83, and limiting pin 86.

Returning to FIGS. 2 and 3, trunnions 42 are formed to project horizontally at both sides from the outside surface of the central part of the power cylinder 41 of the hydraulic servocontrol mechanism. Trunnions 42 are supported rotatably on trunnion bearings 46 mounted on the base frame 112, whereby the power cylinder 41 is pivotally supported. A piston rod 43 for driving the tilting rotary table extends from the left end of the power cylinder 41. The left end of the piston rod 43 and the bottom parts of table frames 36 and 37 are joined by means of a rotary joint 45 for smooth tilting motion of the tilting rotary table 1. As shown partially in the central part of FIG. 3, the rotary joint 45 is formed in a rotatable cross head extending between the table frames 36 and 37. A leveling protrusion 91 for bringing the topside surface of the tilting rotary table 1 to a level is formed near the right-hand side (FIG. 2) of the underside of the tilting rotary table 1. An adjustable stopper 92 corresponding to the leveling protrusion 91 is fixed upright on the base 100.

Finally, the operation of the hydraulic clamping system will be described with respect to the function thereof in fixing the tilting rotary table 1 of the device of the present invention.

Reffering to FIG. 2, the rotary type of a clamp control valve assembly (24, 25, 60) for changing-over the clamp actuating circuits is fixed to the base 100. A clamp control valve element 24 fixed with a clamp control valve operating handle 60 is contained within the casing 25 of the clamp control valve. A conduit pipe 62 is the outlet passage of the casing 25 of the clamp control valve and corresponds to the passage 62 of FIG. 1. A pipe joint 57 receives a conduit pipe extending between the servocontrol valve and the power cylinder.

Shown within FIG. 3 is a table clamping cylinder device 20 for clamping the tilting rotary table 1 immovably. The table clamping cylinder device 20 is fixed on the base 100 and comprises two pistons 30 and 31 fitted in the cylinder body. The solid piston rod of the left piston 30 penetrates through and is slidable within a bore formed through the right piston 31 and its piston rod. Pressing surfaces 32 and 33 formed at the ends of the rods of pistons 30 and 31, respectively, are disposed at the right and left sides, respectively, of the table frame 36 extending downward from the underside of the tilting rotary table 1. An opening 34 of a circular arc is formed along the periphery of the table frame 36 for allowing the tilting motion of the tilting rotary table 1 with respect to the piston rod of the piston 30, which is disposed at a fixed position. When pressurized hydraulic fluid is supplied into the intermediate chamber formed between pistons 30 and 31 through an inlet port 35, pistons 30 and 31 are moved leftward and rightward, respectively, whereby the pressing surfaces 32 and 33 strongly clamping the table frame 36 to fix the tilting rotary table 1 relative to the base 100. This clamping action applies pressures of substantially the same magnitude to the right and the left sides of the table frame 36, with respect to the central plane of rotation, instead of applying a single-directional pressure to one side and thus bending the table frame. The table frame 36, hence the tilting rotary table 1, is not therefore subjected to strain, and successful precision machining of the workpiece is attained.

FIG. 4 shows a worm shaft supporting construction in the housing 72. A clamping ring 74 for clamping the worm shaft 6 is provided at the central part of the worm shaft 6.

Figure 5:
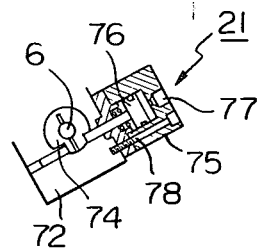

FIG. 5 is a section taken on line V—V of FIG. 4 as seen in the arrow direction. FIG. 5 shows the worm shaft clamping cylinder device 21 for engaging and disengaging the clamping ring 74. The cylinder body 75 of the worm shaft clamping cylinder device 21 is fixed to the housing 72, and a piston 76 combined with a coil spring 78 for disengaging the clamping ring 74 is fitted in the cylinder body 75. When pressurized hydraulic fluid is supplied into the cylinder device through a port 77, the piston 76 moves against the resilient force of the coil spring 78 to make the clamping ring 74 take a firm hold of the worm shaft 6. When the hydraulic fluid is drained from the cylinder, the piston 76 is returned by the resilient force of the coil spring 78 to disengage the clamping ring 74.

As described hereinbefore, the first embodiment of the present invention completely eliminates the variation of the load on the worm gearing, liable to occur during the tilting operation of conventional tilting rotary table devices, through the use of a hydraulic servomechanism of superior response characteristics and, furthermore, improves the accuracy of engagement and the durability of the worm gearing through allowing the worm shaft to be always rotated by a rotative operation of a constant torque. Furthermore, since the time lag between the rotation of the worm shaft and table tilting motion is extremely small, the tilting rotary table device of the present invention is suitable for continuous machining of a workpiece under varying inclinations of the tilting rotary table. Particularly, since the worm shaft can be rotated and kept at a uniform speed with a small torque, even with under varying loads working on the worm gearing during machining, automatic program control machining can be attained.

Still further, the tilting rotary table device of the present invention is capable of not only firm and reliable clamping of the tilting rotary table merely by operating the clamping control valve of the hydraulic clamping system, but also sequential control of the tilting rotary table clamping operation.

Figure 7:
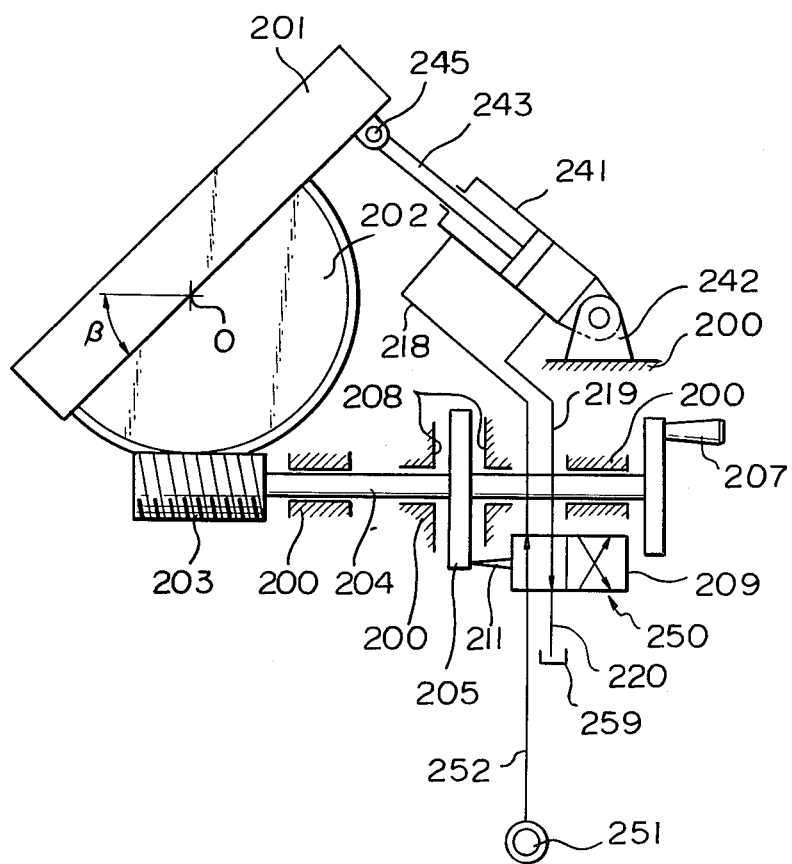
FIG. 7 is a schematic illustration of a second embodiment of the tilting rotary table device according to the present invention.

FIG. 7 shows a second embodiment of the tilting rotary table device according to the present invention. A tilting rotary table 201 is inclined at an angle of β to a horizontal plane. A sector worm wheel 202 is fixed to the underside of the tilting rotary table 201 by means of bolts or any other suitable means so that the tilting rotary table 201 and the sector worm wheel 202 form a single unit. The tilting rotary table 201 is supported rotatably by a bearing device disposed in the housing formed on a fixed base 200. In mounting the tilting rotaty table 201 on the base 200, the tilting rotary table 201 may be supported, for example, by trunnions, formed so as to protrude outward from both sides of the tilting rotary table 201 in alignment with the axis of rotation of the tilting rotary table 201, on the bearings of the bearing device. The sector worm wheel 202 is engaged with a worm 203. A worm shaft 204 fixed to the worm 203 is supported on bearings within a bearing housing and is rotatably operable. The worm shaft 204 is fixed with a thrust detecting disk 205 at the middle position thereof and with a handle 207 for tilting operation at the free end thereof. The worm shaft 204 is illustrated in FIG. 7 in the form adapted for manual operation, but can be designed, if necessary, in a form adaptable to a driving system employing a control motor, in which the worm shaft is driven under an electric automatic control system according to a sequential machining program. Limiting surfaces 208 for limiting the axial movement of the detecting disk 205 define the maximum stroke of the valve element of a servocontrol valve and contribute to preventing the breaking of the valve element. Reference numerals 250 and 241 designate a servocontrol valve unit and a hydraulic power cylinder unit belonging to the hydraulic servomechanism and a power cylinder also belonging to the hydraulic servomechanism. A stylus 211 attached to the free end of the valve element of a servocontrol valve 209 is kept in continuous contact with the thrust detecting disk 205 mounted on the worm shaft 204 to follow the axial movement of the thrust detection disk 205 and control the servocontrol valve 209. A pressure source 251 is formed usually in a hydraulic pump unit. Reference numeral 259 designates a reservoir for containing a hydraulic fluid. The hydraulic power cylinder 241 is mounted pivotally at one end on a supporting frame 242 disposed on the fixed base 200. The piston rod 243 of the hydraulically operated piston of the hydraulic power cylinder 241 slidingly reciprocates through an opening formed at the other end of the power cylinder 241. The free end of the reciprocative piston rod 243 is pivotally connected to the tilting rotary table 201 at a lower peripheral part thereof.

The operating mode of the second embodiment will now be described. Assume an initial state where the tilting rotary table 201 is positioned with its topside surface horizontal and is clamped relative to the fixed base 200. One first fixes the desired workpiece on the topside surface of the tilting rotary table, disengages the table clamping mechanism, then operates the worm shaft rotating handle 207 to set the tilting rotary table 201 to the desired angle of inclination of $\beta$. When the handle 207 is rotated against the load applied to the tilting rotary table 201, a thrust of a magnitude proportional to the intermeshing pressure between the sector worm wheel and the worm is applied axially to the worm shaft 204, since it is usual that the intermeshing pressure between a worm and a worm wheel produces thrusts axially of the worm and the worm wheel. Accordingly, the thrust detecting disk 205 fixed to the worm shaft 204 is moved in the direction of action of the thrust. The thrust detecting disk 205 actuates the valve element of the servocontrol valve 209 through the stylus 211, which is in continuous contact with the thrust detecting disk. The distance of movement of the thrust detecting disk controls the opening area of the ports of the servocontrol valve 209 to make the power cylinder produce a table driving force of a magnitude and a direction which counteracts the thrust. For example, when rotating the worm shaft 204 to turn the tilting rotary table 201 in a counterclockwise direction, a leftward thrust is applied to the worm shaft 204, therefore, the thrust detecting disk 205 is biased leftward. Accordingly, a slight elastic deformation of the meshing surface of the worm 203 is unavoidable for allowing the axial displacement of the worm shaft 204. It is obvious that such an elastic deformation can be kept below a fixed limit, and the displacement of the disc due to the deformation is less than the maximum stroke of the stylus. The valve element of the servocontrol valve 209 moves leftward, corresponding to the leftward movement of the detecting disk 205, to appropriately control the ports of the servocontrol valve 209. In this case, the right chamber of the power cylinder 241 is connected to the pressure source 251 through the circuit of the pressure source 251 - the passage 252 - the servocontrol valve 209 - the passage 219 - power cylinder 241, whereas the left chamber of the power cylinder 241 is connected to the reservoir 259 through the circuit of the power cylinder 241 - the passage 218 - the servocontrol valve 209 - the return passage 220 - the reservoir 259. Consequently, the tilting rotary table 201 is turned on its trunnions due to a moment of force produced by the driving force of the power cylinder 241 acting in a direction to counteract the thrust working on the worm shaft, thereby relieving the elastic deformation of the meshing surface of the worm. The operating mode as described hereinbefore is continued until the rotative operation of the worm shaft 204 is stopped, wherein at any stop positions of the table the detecting disc and the servocontrolled valve are in their neutral positions respectively. The tilting rotary table is clamped relative to the fixed base 200 after the tilting rotary table has been tilted in the angle of inclination of $\beta$.

The second embodiment of the tilting rotary table device according to the present invention is not only capable of allowing light rotative operation of the worm shaft in tilting the tilting rotaty table independently of the load working on the tilting rotary table, but is also capable of keeping the elastic deformation of the tooth surface of a meshing tooth of the worm below a small fixed limit. Therefore, the inclination error resulting from the elastic deformation of the worm can be minimized, thus improving the accuracy of inclination and improving the operation of the tilting rotary table. Furthermore, even if breakage occurs in the hydraulic system, the tilting rotary table will not unduely and suddenly change in inclination, since the tilting rotary table is safely restrained at its position by the engagement of the sector worm wheel with the worm. In such a case, the table's reacting force counteracts on one of either limiting walls disposed opposite to the detecting disk 205 with a small gap.

I claim:

1. A tilting rotary table device, characterized in that a tilting rotary table is supported on trunnions on a base frame for tilting movement; a hydraulic servomechanism including a power cylinder having a piston rod with a free end and a hydraulic servocontrol valve having a stylus is mounted on said base with the free end of the piston rod thereof connected to said tilting rotary table; a worm wheel and a stylus operating arm are rotatably and loosely fitted on one of the trunnions of said tilting rotary table as a single unit; said worm wheel has a worm shaft and is adapted to be rotatively controlled to a desired inclination by means of a rotation control system controlling the worm shaft supported on said tilting rotary table; the stylus operating arm is adapted to be in contact wth the stylus of the hydraulic servocontrol valve and to attain the setting of said tilting rotary table for a desired inclination through the following--up action of said tilting rotary table resulting from rotative operation of said worm shaft; a hydraulic table clamping device is provided on the base for clamping the tilting rotary table relatively to the base; and a hydraulic worm shaft clamping device is mounted on said tilting rotary table for clamping said worm shaft.

2. A tilting rotary table device comprising:

a tilting rotary table supported by trunnions on a base frame for tilting movement;

a hydraulic servomechanism disposed on said base frame, said hydraulic servomechanism including a power cylinder unit adapted to tilt said tilting rotary table, and a servocontrol valve interposed between said power cylinder unit and a source of pressurized hydraulic fluid, said valve having a valve element and a stylus on said valve element;

mechanical means for initiating a desired table tilting motion, said mechanical means including a frame body incorporated into said tilting rotary table as a single unit, a worm shaft rotatably mounted in said frame body, and a worm attached to said worm shaft;

balancing actuator means adapted to be displaced by a predetermined distance by said mechanical means for initiating a desired table tilting motion in order to move the valve element of said hydraulic servomechanism from a neutral position to cause said power cylinder unit to tilt said tilting rotary table, said balancing actuator means including a stylus operating arm rotatably mounted on and depending from one of the trunions of said tilting rotary table and a worm wheel operatively associated with said stylus operating arm and rotatably mounted on said one of the trunnions, said worm engaging said worm wheel, said stylus operating arm being adapted to be in contact at a free end thereof with said stylus; and a fluid piping arrangement for supplying hydraulic fluid from said source of pressurized hydraulic fluid to said power cylinder unit through the servocontrol valve in a manner that the tilting movement of the tilting rotary table counteracts the initial displacement of said balancing actuator means tending to move said valve element back to its neutral position.

3. A tilting rotary table device according to claim 2, wherein said servocontrol valve is disposed with the axis of the valve element thereof substantially perpendicular to the working radius of said stylus operating arm; the worm wheel and the stylus operating arm, which are formed separately and are loosely fitted on one of the trunnions of the tilting rotary table, are unitedly connected by means of an extension spring; the servocontrol valve is fixed with a limiting pin adjacent to said stylus for limiting the excessive retraction of said stylus; and the worm gearing is prevented from overloading through the tightening force of said extension spring.

4. A tilting rotary table device according to claim 2, wherein the worm wheel and the stylus operating arm are formed as a single member and loosely fitted on one of the trunnions of the tilting rotary table for rotary motion; a curved cam surface is formed along the free end of said stylus operating arm; and the stylus of the servocontrol valve is pressed against said cam surface.

5. A tilting rotary table device comprising:
a tilting rotary table supported by trunnions on a base frame for tilting movement;
a hydraulic servomechanism disposed on said base frame, said hydraulic servomechanism including a power cylinder unit adapted to tilt said tilting rotary table, and a servocontrol valve interposed between said power cylinder unit and a source of pressurized hydraulic fluid, said valve having a valve element and a stylus on said valve element;
mechanical means for initiating a desired table tilting motion, said mechanical means including a worm wheel incorporated into the tilting rotary table having an axis of rotation aligned with an axis of rotation of said tilting rotary table, a worm shaft rotatably mounted on said base frame, and a worm mounted on said shaft engaging said worm wheel, said worm shaft being minutely axially movable;
balancing actuator means adapted to be displaced by said mechanical means for initiating a desired table tilting motion in order to move the valve element of said hydraulic servomechanism from a neutral position to cause said power cylinder unit to tilt said tilting rotary table, said balancing actuator means including a detecting disk fixedly mounted on said worm shaft for detecting axial displacement of said worm shaft caused due to axial thrust force working on said worm shaft, said stylus being aligned in parallel with said worm shaft and contacting said detecting disk, said stylus being made to deviate from neutral through axial movement of the disk and worm shaft; and
a fluid piping arrangement for supplying hydraulic fluid from said source of pressurized hydraulic fluid to said power cylinder unit through said servocontrol valve in such a manner that the tilting movement of the rotary tilting table counteracts axial movement of the worm shaft through the worm and worm wheel tending to move said valve element back to its neutral position.

6. A tilting rotary table device comprising a base frame, a tilting rotary table supported on the base frame by two trunnions outwardly projected at opposite sides of the table, and mechanical means for bringing the surface of the table under load to a desired inclination formed by a worm wheel and a worm fixed on a drivable worm shaft, characterized by a hydraulic feed back servo-control system interposed between the drivable work shaft and the rotary table, in which a sector-shaped wormwheel and a stylus operating arm are integrally connected together with each other and pivotally mounted on one extended trunnion of the table in one piece, a servo-control valve unit having a valve element in which the valve is designed to hold the axial neutral position within a valve casing and provided with a stylus on one outer end of a valve stem thereof, and the stylus is in contact with the stylus operating arm so as to convert minute rotation of the arm to corresponding axial displacement of the stylus, a hydraulically operatable power cylinder unit for continuously effecting tilting motion of the rotary table with powerful force during operation of the worm shaft comprises a telescopically composed piston rod and a cylinder forming fluid supplying chambers therein; two longitudinal ends of the unit being pivotally connected respectively to the table and the base frame, and the unit further includes fluid pipelines communicating with a source of pressurized fluid by way of the servo-control valve unit interposed therebetween;

whereby whenever an angular movement of the stylus operating arm connected to the sector worm wheel is initiated through driving of the worm shaft, the servocontrol valve is deviated in either selected directed from the neutral position thereof within the range of a predetermined stroke so as to allow supply of the fluid into one of the cylinders of the power cylinder unit, subsequently the actual tilting motion continues throughout the duration of rotation of the wormshaft in such a manner that the tilting movement of the table counteracts the initial angular displacement of the stylus operating arm, namely restricts the axial displacement of the servo-control valve within the predetermined stroke, thus eliminating severe stresses created on the mating teeth surfaces of the worm gearing mechanism.

7. A tilting rotary table device according to claim 6, wherein the drivable worm shaft having the worm is rotatably supported on the body of the table forming the lower portion of the table by means of a pair of bearings arranged thereon, and the sector worm wheel mating with the worm and the stylus operating arm hung down from the extended trunnion of the table are integrally joined to each other by means of an extendable spring, and further a stopper to limit a possible excessive angular movement of the stylus operating arm caused independently out of that of the worm wheel is provided on a portion of the base frame near the stylus of the servo control valve whereby the servo-control valve is relieved from damages likely to arise due to excessive axial movement thereof.

8. A tilting rotary table device according to claim 7, wherein an abutment surface formed on the free end of the stylus operating arm facing the stylus conforms with a substantially radial direction of the arm and is in a plane substantially perpendicular to the axis of the servo-control valve positioned under a stationary condition thereof.

9. A tilting rotary table device according to claim 7, wherein the abutment surface formed on the free end of the stylus operating arm facing the stylus is a curved cam contoured along the periphery of the arm, in which the profile of the cam, in a plane through which the stylus operating arm is moved, has a flat portion perpendicular to the axis of the valve for letting the valve rest at the neutral position thereof and a circular portion contoured by continuously increasing radii for rendering effectively variant minute axial displacement to the valve, whereby excellent responsibility in the movement of the servo-control valve and its security are obtainable.

10. A tilting rotary table device according to claim 7, wherein a hydraulically operatable table clamping device is provided on the base frame for clamping the inclined table located at a desired inclination relative to the horizontal, and also another hydraulically operatable clamping device is carried on the body of the tilting table for firmly holding the worm shaft immovably onto the table under loaded conditions.

11. A tilting rotary table device comprising a base frame, a tilting rotary table supported on the base frame by two trunnions outwardly projected at opposite sides of the table, and mechanical transmitting means formed of a worm and worm wheel gearing in which the worm wheel is shaped in a sector worm wheel type and is concretely fixed onto the lower side of the table, and a drivable worm shaft firmly securing the worm thereto is rotatably supported on the stationary base frame by a pair of bearings, characterized by a hydraulic feedback control system having an axial thrust force detecting means, wherein a thrust detecting disc forming the main part of the thrust force detecting means is rigidly secured to an extended drivable worm shaft which shaft is axially free and rotatable on the bearings, and both flat sides of the disc are confronted with stationary limiting walls at a predetermined distance spaced to each other so as to restrict excessive displacement of the disc, a servo-control valve unit including a hydraulically operatable power cylinder mechanism, a source of pressurized working fluid, and communicating piping lines laid therebetween is arranged on the base frame in which a servo-control valve is designated to self-hold the axial neutral position thereof, and a stylus fitted on the outer end of the valve is resiliently contacted against one side surface of the thrust detecting disc, whereby whenever minute axial displacement of the disc is effected along the worm shaft due to severe stresses generated on teeth surfaces of the mating worm and worm wheel, the servo-control valve is slightly deviated from the neutral position thereof, subsequently the power cylinder unit is actuated to tilt the rotary table toward a desired inclined position in such a manner that a tilting movement of the table counteracts the initially deviated axial displacement of the servo-control valve, thus eliminating severe stresses occurring at the engagement of the worm and worm wheel.

* * * * *